(12) United States Patent
Kahne et al.

(10) Patent No.: US 11,755,361 B2
(45) Date of Patent: Sep. 12, 2023

(54) FREEDOM FROM INTERFERENCE FOR AGGREGATED COMMUNICATION CHANNEL HANDLING USING EVENT-BASED PROCESSOR EXTENSIONS

(71) Applicant: NXP B.V., Eindhoven (NL)

(72) Inventors: Brian Christopher Kahne, Austin, TX (US); Michael Andrew Fischer, San Antonio, TX (US); Robert Anthony McGowan, Cedar Park, TX (US)

(73) Assignee: NXP B.V., Eindhoven (NL)

( * ) Notice: Subject to any disclaimer, the term of this patent is extended or adjusted under 35 U.S.C. 154(b) by 39 days.

(21) Appl. No.: 17/502,160

(22) Filed: Oct. 15, 2021

(65) Prior Publication Data

US 2023/0117223 A1    Apr. 20, 2023

(51) Int. Cl.
    *G06F 9/54*      (2006.01)
    *G06F 9/48*      (2006.01)
    *H04J 3/10*      (2006.01)

(52) U.S. Cl.
    CPC .............. *G06F 9/4812* (2013.01); *G06F 9/542* (2013.01); *H04J 3/10* (2013.01)

(58) Field of Classification Search
    CPC ...... G06F 9/30018; G06F 9/4812; G06F 9/542
    USPC ........................... 718/108; 719/318; 712/224
    See application file for complete search history.

(56) References Cited

U.S. PATENT DOCUMENTS

| | | | |
|---|---|---|---|
| 6,697,935 B1 | 2/2004 | Borkenhagen et al. | |
| 7,444,641 B1* | 10/2008 | Diepstraten et al. | G06F 9/4812 712/228 |
| 8,024,735 B2 | 9/2011 | Rudd et al. | |
| 8,155,003 B2 | 4/2012 | Dong et al. | |
| 9,921,891 B1* | 3/2018 | Wood | G06F 9/4812 |
| 2009/0177826 A1* | 7/2009 | Conti et al. | G06F 21/554 710/262 |
| 2009/0240928 A1 | 9/2009 | Fischer et al. | |
| 2010/0162269 A1* | 6/2010 | Lucas et al. | G06F 11/3495 719/318 |

OTHER PUBLICATIONS

Gabor et al., Fairness and Throughput in Switch on Event Multi-threading, 2006 39th Annual IEEE/ACM International Symposium on Microarchitecture (MICRO'06), 2006.

* cited by examiner

*Primary Examiner* — Andy Ho (57) ABSTRACT

A system, method, and apparatus are provided for handling communications with external communication channel hardware devices by a processor executing event-based programming code to interface a plurality of virtual machines with the external communication channel hardware devices by providing the processor with an event latch for storing hardware events received from the external communication channel hardware devices, with a timer circuit that generates a sequence of timer interrupt signals, and with a masking circuit that masks the hardware events stored in the event latch with an event mask in response to each timer interrupt signal, where each event mask is associated with a different virtual machine running on the processor such that each virtual machine is allowed to communicate only on a masked subset of the hardware events specified by the event mask to ensure freedom from interference between the plurality of virtual machines when communicating with the external communication channel hardware devices.

20 Claims, 3 Drawing Sheets

FREEDOM FROM INTERFERENCE FOR AGGREGATED COMMUNICATION CHANNEL HANDLING USING EVENT-BASED PROCESSOR EXTENSIONS

BACKGROUND OF THE INVENTION

Field of the Invention

The present disclosure is directed in general to field of data communications. In one aspect, the present disclosure relates to a method and system for consolidating multiple electronic control units (ECUs) into a smaller number of devices.

Description of the Related Art

Automotive vehicles increasingly include integrated circuit computer systems —such as electronic control units (ECUs), microcontrollers (MCUs), power train control modules (PCM), System(s)-on-a-Chip (SoC), and System(s)-in-a-Package (SiP) — that are connected together over a network or system bus to form an automotive vehicle network. For example, a controller area network (CAN) bus is a message-based communications bus protocol that is often used within automobiles to enable communications between various electronic control units (ECUs) which perform various control applications, such as for airbags, antilock brakes, cruise control, electric power steering, audio systems, windows, doors, mirror adjustment, battery and recharging systems for hybrid/electric cars, and many more. As more electronic features are implemented on automotive vehicles with dedicated separate ECUs connected to a shared communication bus, there are cost increases and performance disadvantages with using a distributed ECU system for implementing multiple electronic features, but there are some advantages of having separate ECUs. For example, when each ECU has its own dedicated bus interface circuit for connecting to the shared communication bus, there is a guaranteed freedom from interference between each ECU-implemented electronic feature. Even so, the automotive industry is increasingly interested in consolidating multiple ECUs into a smaller number of devices in order to improve performance by reducing costs, simplifying design complexity, and improving flexibility by enabling the addition of new features via software updates including after the vehicle has been sold to a customer.

One way for consolidating ECU functionality is to implement the functionality of physically separate ECUs as virtual ECUs running as virtual machines (VMs) on a single, larger ECU. Modern microprocessors have extensive feature sets designed to be able to implement multiple virtual machines and to guarantee freedom from interference between the virtual machines. However, each VM must communicate with the outside world (e.g., externally from the microprocessor) using a limited communication channel interface, such as a Controller Area Network (CAN). While physically distinct ECUs would each have their own limited set of CAN channels to guarantee freedom from interference from one another, newer consolidated devices with VM-implemented ECUs are provided with a larger set of CAN channels which are divided up and mapped to each ECU VM. This raises the question of how to implement freedom from interference between these sets of CAN channels to service the interface. For example, if one ECU VM is associated with 4 CAN channels which are sending and receiving numerous long messages where slightly higher latency can be tolerated, freedom from interference requires that this higher bandwidth utilization should not interfere with a different set of CAN channels that are only processing very short messages with very low latency requirements.

With existing data processing system which include communication interface subsystem of moderate bandwidth (e.g., CAN), a microprocessor may run dedicated firmware to implement the freedom from interference protocol, but such systems typically either over-design the hardware (e.g., by using one or more large cores to ensure that the processing hardware is fast enough to be able to handle the maximum bandwidth on all channels combined) or physically divide up the hardware (e.g., by using a separate, small processor which can be mapped to each VM in the larger system). Freedom from interference can also be implemented purely in software, but this requires very careful design of the code as well as computational constraints that can negatively impact performance. The disadvantages of over-designing the hardware include higher costs, but there are also disadvantages with the multi-core approach, including the lack of flexibility for handling different numbers of VMs. In addition, if there are too many cores for the number of VMs being used, this is a waste of resources, while too few cores means that freedom from interference cannot be guaranteed.

As seen from the foregoing, the existing solutions for consolidating ECU functionality are extremely difficult at a practical level by virtue of the challenges with meeting the cost constraints and performance requirements for guaranteeing freedom from interference between aggregated communication channels implemented on a single processor.

BRIEF DESCRIPTION OF THE DRAWINGS

The present invention may be understood, and its numerous objects, features and advantages obtained, when the following detailed description of a preferred embodiment is considered in conjunction with the following drawings.

DETAILED DESCRIPTION

An apparatus, system, architecture, methodology, and program code are described for ensuring freedom from interference when handling aggregated communication channels to service multiple virtual machine ECUs or other isolated execution contexts running at single processor core by using event-based hardware extensions to quickly respond to the per-channel low-level protocol handling hardware (e.g., transmit and receive FIFOs). In selected embodiments, the event-based hardware extensions may include a set of hardware event latches, a plurality of hardware event masks, and an interrupt timer which are connected to implement time domain multiplexing of the virtual machines or contexts executing on the processor core (e.g., an SOEMT core) which is directly interfacing with the hardware event latches and event masks as low-level communications hardware to implement the lower levels of the communication stack, while the bulk of the code for an application will run on a larger applications processor which communicates with the processor core. In operation, hardware events generated by the per-channel low-level protocol handling hardware are latched into the set of hardware event latches where they are held until they are processed by a virtual machine ECU or other isolated execution context running on the processor core. In addition, each hardware event mask which is associated with a corresponding virtual machine ECU or context may be stored in event mask hardware registers where, in response to a timer interrupt or select signal, they are sequentially presented for logical combination with the latched hardware events to filter out the communication channels so that only the hardware events associated with the channels of interest are supplied to a particular virtual machine or context running on the system. By using the interrupt timer to periodically switch or sequence through the plurality of hardware event masks which are applied to the latched hardware events, the latched hardware events are effectively filtered so that the current virtual machine or context only services the set of events specified by the selected event mask. To process the filtered set of hardware events presented to an virtual machine or context, the processor core may use wait-for-event instructions to wait on events captured at the set of hardware event latches, or to allow another thread to proceed, in the case of a multi-threaded processor. As seen from the foregoing, the event-based hardware extensions may be used to implement time division multiplexing (TDM) of the aggregated communication channels used by the processor core to run multiple virtual machines or contexts so that only masked hardware events are recognized by the corresponding virtual machine or context, thereby providing for freedom of interference when using a single processor core to service multiple external hardware over aggregated communication channels between sets of these channels mapped to multiple virtual machines in the larger system context.

As described hereinbelow, the disclosed embodiments can be arranged and designed in a wide variety of different configurations. Thus, the following detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated. Furthermore, the described features, advantages, and characteristics of the invention may be combined in any suitable manner in one or more embodiments. One skilled in the relevant art will recognize, in light of the description herein, that the embodiments can be practiced without one or more of the specific features or advantages of a particular embodiment. In other instances, additional features and advantages may be recognized in certain embodiments that may not be present in all embodiments. In addition, it will be appreciated that the techniques described herein can be applied to any type of computer network system, including but not limited to computer systems connected in an in-vehicle network (IVN), Controller Area Network (CAN), a Local Interconnect Network (LIN), an Ethernet network, and the like. Although in some embodiments a specific type of CAN is described, it should be noted that the embodiments are not restricted to a specific type of CAN.

Figure 1:
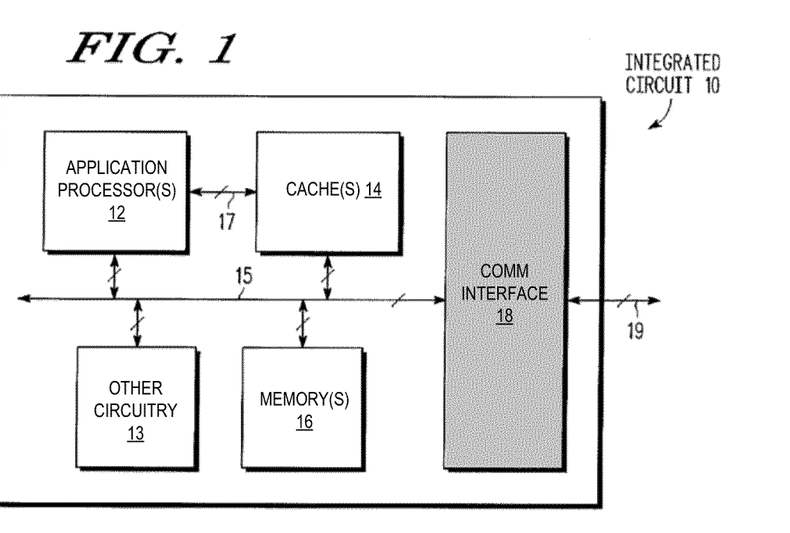
FIG. 1 is a block diagram of a general purpose data processing system wherein one or more application processors and a communication interface uses event-based processor extensions to provide freedom from interference for aggregated communication channel handling in accordance with selected embodiments of the present disclosure.

To provide additional details for an improved understanding of selected embodiments of the present disclosure, reference is now made to FIG. 1 which depicts a simplified block diagram of a general purpose data processing system 10 that includes one or more application processors 12, cache(s) 14, memory(s) 16, a communication interface 18, and other circuitry 13 connected together as shown over one or more internal communication bus interconnects 15, 17 which are illustrated for simplicity as major functional blocks via bus, though any suitable interconnection technique may be employed. As will be appreciated, the data processing components 12-18 may be embodied as an integrated circuit 10, though one or more components may be implemented in separate integrated circuits. In general, integrated circuit 10 may use the external bus 19 or other suitable interfaces to interface to external hardware components, such as transmit or receive FIFO circuits used for processing direct memory access (DMA) transfers, UART packets, transmit or receive packets completion, encryption computations, or the like.

The application processor(s) 12 are of any type which support for executions of instruction instances that implement an event-based programming model wherein the flow of the program is determined by events, such as user actions (mouse clicks, key presses), sensor outputs, or message passing from other programs or threads. In an event-driven application, there is generally a main loop that listens for events and then triggers a callback function when one of those events is detected. In selected embodiments, the application processor(s) 12 may include a fetch buffer or other facility for storing instructions to be executed by the processor(s), decoder and sequencing logic, one or more execution units, and register storage, together with suitable data, instruction and control paths. At any given time, consistent with a computation performed by application processor(s) 12, units of program code (e.g., instructions) and data reside in memory(s) 16, cache(s) 14 and/or processor stores (such as the fetch buffer, registers, etc.). In general, any of a variety of hierarchies may be employed, including designs that separate or commingle instructions and data in memory or cache. While separate memory(s) 16 and cache(s) 14 are shown, it will be appreciated that additional or fewer levels of memory hierarchy may be used.

As described more fully hereinbelow, the application processor(s) 12 and communication interface 18 use event-based processor extensions to provide freedom from interference for aggregated communication channel handling over the external bus 19 to external communication hardware. To this end, the communications interface 18 may include a communications processor core which directly interfaces with low-level communications hardware extensions, such as an event latch and event masking circuit, to implement lower levels of the communication stack. In addition, the application processor(s) 12 will execute the bulk of the code for an application and will communicate with the communications processor core, such as by using a shared memory or other interface. In this way, the communications processor core acts as a communications accelerator to handle the protocol and convert the messages over into a usable, validated form that the stack running on the application processor(s) 12 can easily use.

Figure 2:
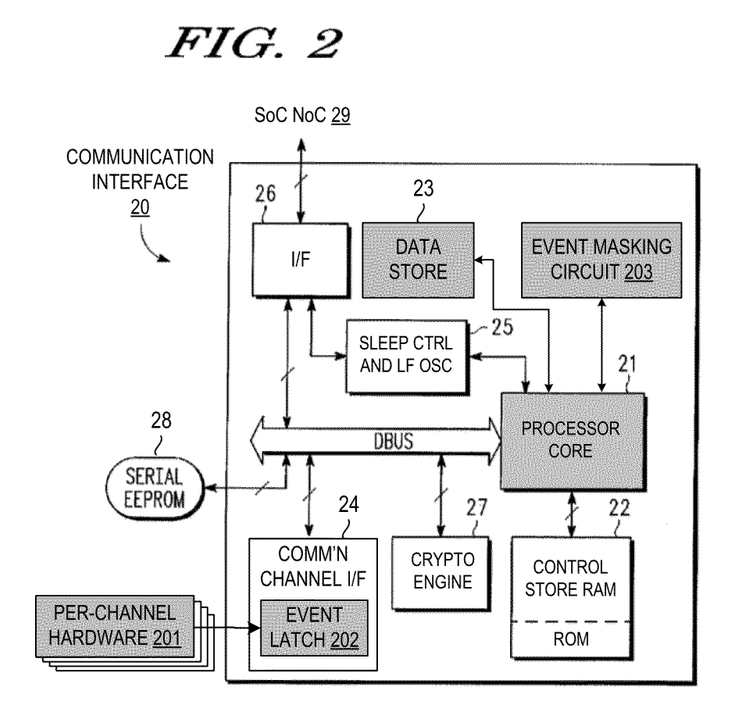
FIG. 2 is a block diagram of an embedded communication interface included in a data processing system in accordance with selected embodiments of the present disclosure.

To provide additional details for an improved understanding of selected embodiments of the present disclosure, reference is now made to FIG. 2 which depicts a simplified block diagram of an embedded communication interface system 20 that may be included in an SoC data processing system. In selected embodiments, the communication interface system 20 may be an example implementation of the communication interface 18 shown in FIG. 1, though other implementations are possible. As depicted, the embedded communication interface system 20 is connected as an interface between external per-channel communication hardware devices 201 and the SoC Network on a Chip (NOC) 29 which is an internal communication bus interconnect for the SoC data processing system. As depicted, the embedded communication interface system 20 includes a processor core 21, control store 22, data store 23 and various illustrative data and control flow paths over one or more interconnect busses (e.g., DBUS) to the communication channel data and control interface 24, sleep control and timing/oscillator circuits 25, host interface circuit 26, dedicated cryptographic engine 27 (or processor), and serial EEPROM 28. Though not shown, the processor core 21 may include a fetch buffer or other facility for storing instructions to be executed by one or more execution units of the core, decoder and sequence control logic, timer and event handling logic, and register storage, together with suitable data, instruction and control paths.

Internal components of the embedded communication interface system 20 are interconnected and interoperate using any suitable techniques. For simplicity, interconnection amongst major functional blocks is illustrated with a bus DBUS and separate dedicated pathways (e.g., busses) for transfer of data to/from a local data store 23 and for fetching instructions from a local control store 22. However, it will be appreciated that any suitable interconnection techniques and topologies may be employed. In general, communication interface system 20 may interface with external components (e.g., a host processor or system), transmit/receive circuits, event sources, input output devices, etc., via external buses or using other suitable interfaces. At any given time, consistent with a computation performed, units of program code (e.g., instructions) reside in control store 22 and units of data reside in data store 23 and/or in stores provided within processor core 21 (such as context-specific fetch buffers, registers, etc.) In selected embodiments, the embedded communication interface system 20 may be configured to operate with a "Harvard-architecture" style separation of instructions and data, although other approaches and other storage hierarchies may be employed.

As depicted, the embedded communication interface system 20 includes a communication channel data and control interface 24 having an event latch 202 for storing hardware events received from the plurality of external per-channel communication hardware devices 201. In addition, the embedded communication interface system 20 includes an event masking circuit 203 that masks the hardware events stored in the event latch 202 with an event mask in response to timer interrupt signals generated by the sleep control and timing/oscillator circuits 25. In selected embodiments, the event masking circuit 203 may include or retrieve a plurality of event masks, each associated with a different virtual machine or context running on an external application processor such that each virtual machine or context is allowed to communicate only on a masked subset of the hardware events specified by the event mask to ensure freedom from interference between the plurality of virtual machines when communicating with the external communication channel hardware devices 201. By using the event masking circuit 203 to sequentially filter the hardware events stored in the event latch 202 so that only the VM or context relevant hardware events are presented to the processor core 21, the embedded communication interface system 20 is configured to handle communications with the external hardware devices 201 that are required by a plurality of virtual machines or other isolated execution contexts running on an external application processor that executes event-based programming code and that is accessed over the communication bus interconnects 29.

Design choices made in at least some processor and integrated circuit implementations may deemphasize or eliminate the use of priority interrupts which are often employed in conventional general purpose processor designs and instead, treat real-time (exogenous and endogenous) conditions as events. For example, in some implementations, assertion of an (enabled) event activates a corresponding one of multiple execution contexts, where each such context has (or can be viewed as having) its own program counter, fetch buffer and a set of programmer-visible registers. Contexts then compete for execution cycles using prioritized, preemptive multithreading, sometimes called Switch-On-Event Multi-Threading" (SOEMT). In some SOEMT processor implementations, context switching occurs under hardware control with zero overhead cycles. In addition, an instruction that has been issued will complete its execution, even if a context switch occurs while that instruction is still in the execution pipeline. In an illustrative SOEMT processor implementation, once a context is activated, the activated code runs to completion (subject to delays due to preemption by higher-priority contexts). If another of the context's events is asserted while the context is active to handle a previous event, handling of the second event occurs immediately after the running event handler terminates. Typically, deactivation of one context and initiation (or resumption) of the next context occurs based on execution of a wait instruction.

Figure 3:
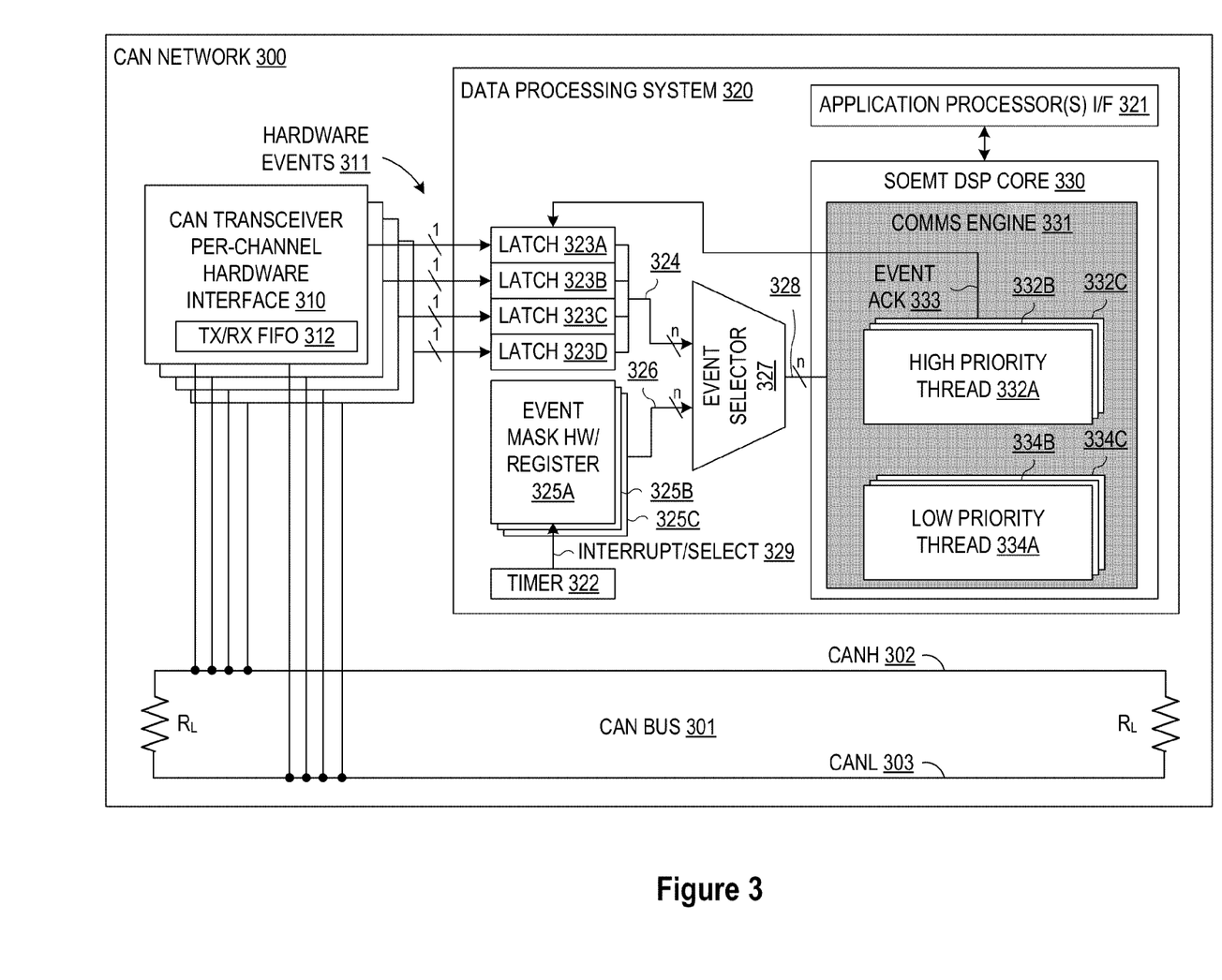
FIG. 3 depicts a simplified block diagram of a CAN network data processing system having a hardware event register and event masking circuit which are used by a communications engine on a single processor core to enable freedom from interference during aggregated communication channel handling over per-channel hardware device in accordance with selected embodiments of the present disclosure.

To provide additional details for an improved understanding of selected embodiments of the present disclosure, reference is now made to FIG. 3 which depicts a simplified block diagram of a CAN network 300 in which a data processing system 320 (having a SOEMT DSP core 330 and application processor interface 321) is connected to a CAN transceiver per-channel hardware interface 310 and CAN bus 301. In selected embodiments, the CAN network 300 may be an example implementation of the communication interface 20 (having a processor core 21 and host interface circuit 26) which is connected to a per-channel hardware 201 shown in FIG. 2, though other implementations are possible. As depicted, the CAN network 300 includes a plurality of CAN transceiver hardware interface circuits 310 connecting a CAN bus 301 to a data processing system 320 wherein a single processor core 330 executes a communications engine 331 that is configured to directly interface between (1) the low-level communications hardware at the CAN transceiver hardware interface circuits 310 and (2) an application processor interface 321 to one or more application processors where a plurality of virtual machines or contexts are running. In operation, the communications engine 331 running on the processor core 330 acts as a communications accelerator which handles lower level communication protocol requirements by converting hardware event messages from the CAN transceiver hardware interface circuits 310 into a usable, validated form that the virtual machines or contexts running on the processor core 330 (e.g., 332A-C, 334A-C) or external application processors can easily use without conflicting or interfering with one another.

To provide for freedom of interference between sets of CAN channels that are mapped to the virtual machines or contexts running on the processor core 330 (e.g., 332A-C) or in the larger system context, event-based hardware extensions are provided in the data processing system 320 for use by the communications engine 331. The event-based hardware extensions include a hardware event register or latch 323A-D, an event mask hardware register 325A-C, an event selector 327, and a timer circuit 322 which are operatively combined to periodically switch through a plurality of hardware event masks (e.g., 325A-C) which are applied to filter the latched hardware events 323A-D at the event selector 327 so that the current virtual machine or context (e.g., 332A) services only the set of events specified by the mask.

As depicted, the data processing system 320 may include a single SOEMT DSP core 330 which communicates over the interface 321 to one or more application processors which are running a plurality of separate virtual machine or other isolation execution contexts, each if which is configured to support application software implementing a CAN protocol controller which interacts with the transceiver hardware interface circuits 310. In addition or in the alternative, the SOEMT DSP core 330 may run multiple virtual machines or other isolation execution contexts (e.g., 332A-C, 334A-C). Wherever executed, each virtual machine or context may include CAN protocol control logic or programming instructions for implementing data link layer transmit and receive operations as is known in the field. For example, a virtual machine or context may perform receive operations by executing CAN protocol control logic or programming instructions to store received serial bits from the transceiver hardware interface circuits 310 until an entire message is available for fetching by the ECU virtual machine. The CAN protocol control logic or programming instructions executed by the virtual machine/context can also be executed to decode the CAN messages according to the standardized frame format of the CAN protocol. In performing transmit operations, the virtual machine or context may execute CAN protocol control logic or programming instructions to receive messages from the virtual machine/context and to transmit the messages as serial bits in the CAN data frame format to the CAN transceiver hardware interface circuits 310.

The CAN bus 301 carries analog differential signals and includes a CAN high (CANH) bus line 302 and a CAN low (CANL) bus line 303. The CAN bus 301 is known in the field, and may operate in accordance with the ISO 11898-1 protocol for normal operations on the data link layer which includes the CAN Flexible Data-Rate ("CAN FD") definition for the data link layer. Accordingly, the CAN protocol controller in each virtual machine or context can be configured to support the normal mode or the flexible data rate mode.

As depicted in FIG. 3, the transceiver hardware interface circuits 310 may include a per-channel hardware circuit, such as an transmit/receive FIFO buffer 312, which is associated with each communication channel and which generates an associated hardware event 311 which can be processed by the SOEMT DSP core 330. With the hardware events presented as a set of single-bit inputs to the data processing system 320, each input may be stored in a corresponding per-event latch 323A-D and used to signal to the SOEMT DSP core 330 that it must be serviced (e.g., the receive FIFO 312 is non-empty and has at least a pre-defined amount of in it to be processed). With the per-event latch 323A-D, the occurrence of each event is remembered until it has been acknowledged by software running on the SOEMT DSP core 330. As an alternative to loading the transmit/receive FIFO 312 in the transceiver hardware interface circuits 310, a direct memory access (DMA) circuit may be configured to transfer data to or from the FIFO 312 into another memory storage device, and then signal the SOEMT DSP core 330 once the transfer is completed so that the SOEMT DSP core 330 recognizes the event and reads the single pointer, thereby eliminating the area requirements for a hardware FIFO 312 in the transceiver hardware interface circuits 310.

If all of the hardware events 311 captured at the set of hardware event latches 323A-D were presented together to the SOEMT DSP core 330 for processing, this could create interference when the SOEMT DSP core 330 interfaces with the external hardware 310. This interference problem can arise when the SOEMT DSP core 330 is executing multiple virtual machines or other isolated execution contexts (e.g., 332) which interface with the external hardware 310, and would only be exacerbated in the case of an external, multi-threaded application processor running multiple virtual machines or other isolated execution contexts. To prevent multiple virtual machines or contexts from interfering with one another when communicating using a mapped set of communication channels over the CAN bus 301, the data processing system 320 uses the event mask hardware or registers 325A-C to specify which of the hardware events 311 stored in the hardware event latches 323A-D will be recognized by the VM/context software running on the processor core 320 or external application processor. In implementation, an n-bit output 326 from the event mask (e.g., 325A) is logically combined with the n-bit output 324 from the per-event latches 323A-D at the event selector 327 which implements a bitwise logical AND gating function when generating the n-bit masked event output 328. By providing a hardware and/or software capability to specify an event mask 325 that is applied to filter the latched events 323A-D, the processor core 320 or hardware thread running on the processor (e.g., 332A) where a wait-for-event instruction occurs is able to proceed only on the set of events specified by the mask.

In cases where the communication channels require extra or complex processing (e.g., encryption/decryption, authentication, etc.), then the data processing system 320 may be provided with a separate, lower priority thread to run these processing tasks. To this end, the SOEMT DSP core 330 may implement one or more additional lower-priority hardware threads 334A-C to perform additional tasks, such as encryption/decryption or verification/authentication for the data being sent/received on the channel. However, when a hardware event occurs, the lower priority thread may be preempted by the higher-priority thread servicing the hardware events.

In selected embodiments, a hardware or software mechanism may be provided to update the event mask 325 from a preconfigured list of masks 325A-C. For example, the ability for software to specify a mask is supported by programming the timer 322 to generate an interrupt or select signal 329 which can update the event mask 325 from a preconfigured list of masks 325A-C. In operation, the timer interrupt software may, on a regular or predetermined interval, set a current event mask, and then select or retrieve the "next" event mask from memory for use with the next succeeding timer interrupt. Alternatively, the timer 322 may be provided as a hardware mechanism which generates a timer interrupt 329 and which uses a pointer to select or retrieve the "next" event mask to update the mask 325 from that associated with one virtual machine or thread (e.g., 332A) to that associated with another virtual machine or thread (e.g., 332B). In other embodiments, a hardware state machine may be used to update the mask 325 in response to a timer signal. In other embodiments, a DMA channel may be programmed to update the mask 325 by reading from memory based upon a periodic timer signal. Each mask (e.g., 325A) in the list of masks 325A-C corresponds to the communication channels of interest to a particular virtual machine or thread (e.g., 332A) running on the SOEMT DSP core 330 or an external application processor running on the larger data processing system.

In operation, an interrupt or event signal can wake the SOEMT DSP core 330 at a regular or specified interval in order to allow a specified routine to execute a simple loop to service the masked hardware events 328. In the service loop, the SOEMT DSP core 330 may run a high priority thread (e.g., 332A) which issues a wait-for-event instruction in order to indicate that it wants to wait for an event to occur and, when awakened, to process the highest priority event in the filtered or masked events 328 which caused the processor or thread to wake. As will be appreciated, if a wait-for-event instruction is interrupted by any interrupt, the wait-for-event instruction must be resumed when the interrupt routine returns, so that the core continues to wait for an event if none have yet occurred. In another implementation, the same result can be achieved with a while loop around a wait-for-event instruction, though this is less elegant and less efficient solution. Event processing at the high priority thread 332 may include making more data available for a transmit operation or moving received data from a hardware structure, such as a FIFO 312 or buffer, to a different region of memory. In this way, the software running in this thread 332 is agnostic about what virtual machine it is processing, and the only virtual machine-relevant information is contained in the event mask 325.

No later than the completion of the event processing, the high priority thread issues an event acknowledgement to reset the corresponding event entry in the hardware event latch. If the masked events of interest 328 for events that have not yet been processed or acknowledged (as determined by the event mask 325), then they have been latched in the hardware event latch 323A-D and will cause the wait-for-event instruction to immediately return. If no events of interest have occurred, then the SOEMT DSP core 330 will either wait or execute a lower priority thread (e.g., 334). When an event of interest does occur, the SOEMT DSP core 330 either wakes or pre-empts the low priority thread 334, and then proceeds to execute the code associated with the high priority thread 332. If the interrupt occurs while the SOEMT DSP core 330 is waiting for an event, then when the routine completes, the core 330 goes back to waiting for an event. Otherwise, the core 330 returns to whatever processing task it was performing, such as executing a low-priority thread 334, if it exists, or the high priority thread 332. This approach is taken because, in the normal implementation of the event facility, the acknowledgment is actually done when the high priority thread begins processing the event. The reason is that, in some cases, the hardware event source is such that another instance of the same event may occur before the previous event processing has been completed, and if the acknowledgement does not occur until the end of said processing, this second event will be lost.

As disclosed herein, the event latch 323, event mask 325, timer 322, and event selector 327 are connected to provide event-based processor extensions which the communications engine 331 uses to filter or mask hardware events 311 to process only the masked events 328 that correspond to the communication channels of interest to a particular virtual machine or context 332 running on the larger system. In particular, the communications engine 331 is configured to use the event-based processor extensions 322-329 to select a single event in situations where multiple events occur simultaneously, and to acknowledge the event which has been processed with an event acknowledgement 333. This may be handled either via instructions or via reads and writes to specialized registers, implementing some form of a hardware priority encoder (e.g., a find-first-one instruction) in order to find the highest priority event, assuming that the highest priority event is considered the event in the least-significant-bit location.

By using a combination of software and hardware extensions, including the latches 323, mask 325, and timer 322, to implement time division multiplexing (TDM) of the SOEMT DSP core 330 operations, a combination of masks for events are sequentially applied so that only hardware events for a currently activated virtual machine or context are recognized and processed by the SOEMT DSP core 330, thereby enabling the handling of communication channels across a plurality of virtual machines and contexts without interference. This hardware-based TDM approach reduces the processing complexity and overhead required from a purely software solution for handling communications on the application cores via a hypervisor or dedicated virtual machine. Instead, the hardware-based TDM approach devices the total bandwidth of the SOEMT DSP core 330 into time-slices corresponding to each virtual machine or context being executed. For a given time-slice, the filtering of the hardware events 311 by the event mask 325 enables the high priority thread servicing the communication channel hardware to be only concerned with the (masked) events associated with the given virtual machine, thus ensuring freedom from interference. And since the hardware event occurrences 311 are maintained in the latches 323, a channel associated with an event which is ignored for the current time-slice is still remembered. As soon as the time slice occurs for a virtual machine which is concerned with this channel, the event mechanism will recognize the event and thus allow the software to process it. As will be appreciated, the programming code should guarantee that the time slices are short enough that each virtual machine receives service in less than the maximum tolerable response latency of its events.

Figure 4:
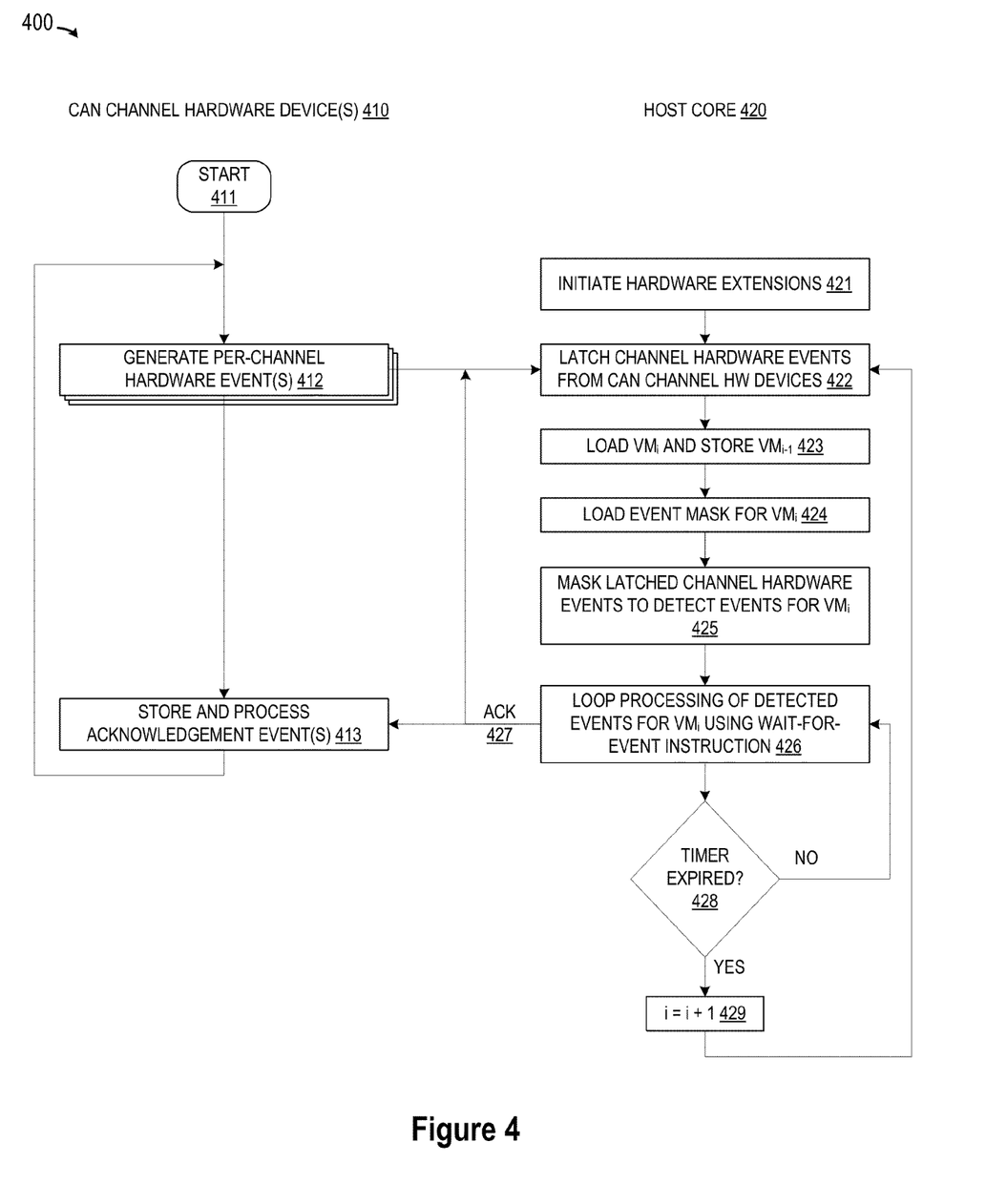
FIG. 4 depicts a simplified flow chart diagram illustrating the logic for combining latched hardware events from a plurality of CAN channel devices with event masks presented by an event masking circuit which uses a time-slicing mechanism to update an event mask register to provide a reliable means to ensure freedom from interference when using a single host core to service the CAN channel devices in accordance with selected embodiments of the present disclosure.

Referring now to FIG. 4, there is depicted a simplified flow chart diagram 400 illustrating the logic for combining latched hardware events from a plurality of CAN channel hardware devices 410 with an event mask register which uses a time-slicing mechanism to update the event mask register to provide a reliable means to ensure freedom from interference when using a single host core 420 to service multiple virtual machines or contexts which communicate with the plurality of CAN channel hardware devices 410 in accordance with selected embodiments of the present disclosure. As illustrated and described more fully hereinbelow, the CAN channel hardware devices 410 perform a sequence of steps 411-413 to generate hardware events and process received event acknowledgements, while the host core 420 performs a sequence of steps 421-429 to service multiple virtual machines or contexts with aggregated communication channels by using event-based hardware extensions at the host core 420.

After the method starts (step 411), one or more per-channel hardware events are generated from the aggregated CAN channels (step 412), such as when a hardware device implementing a CAN communication channel generates an event to signal that it must be serviced. For example, the hardware device may be a transmit/receive FIFO or buffer in a packet or UART processing circuit, and the generated event signals that the receive FIFO is non-empty and has at least a predefined amount of data in it to be processed. In another example, the hardware device may be a DMA circuit which transfers data to or from the FIFO into a memory, and the generated event signals that the transfer was complete. As will be appreciated, each event may be generated after reception and processing of a CAN frame at the hardware device 410 to verify the protocol CRC and store any associated header and payload from the CAN frame at the hardware device, and may be signaled to the host core 420 as a single-bit input.

At some point after the method starts, the host core 420 initiates the hardware extensions (step 421). In selected embodiments, the hardware extensions may include a set of hardware event latches, a hardware event mask, an interrupt timer, and an event selection circuit which are each initiated to an initial set of values. For example, the hardware event latches may be initialized by clearing the register values. In addition, the hardware event mask may be initiated with an initial set of hardware mask values. In addition, the interrupt timer may be initiated to specify a uniform timer interval value so that the timer generates an interrupt at regular intervals, or alternatively may be initiated to specify a plurality of different timer interval values so that the timer generates an interrupt at different, predetermined intervals. In addition, one or more counters or registers at the host core 420 may be initiated to define an initial count value i = 1 and a maximum count value n.

At some point after the hardware events are generated, the hardware events generated by the CAN channel hardware devices 410 are stored or latched at the host core 420 (step 422). In selected embodiments, the hardware events may be stored at a plurality of 1-bit per-channel latches which store or remember the occurrence of each event until it has been acknowledged by software running on the host core 420. In other embodiments, the hardware events may be signaled to the host core 420 after storing the data in memory using a DMA transfer by signaling the host core 420 that the transfer is complete with a per-channel hardware event signal that is stored in an event status register until cleared by the host core 420.

With the hardware events latched or stored, the host core 420 initiates an iterative hardware event processing loop with steps 423-429. In this processing loop, the host core 420 uses event-based hardware extensions to implement time division multiplexing (TDM) of the aggregated CAN channels by dividing the host core's processing bandwidth into time-slices corresponding to a plurality virtual machines $VM_i$, i = 1 - n.

At step 423, the iterative hardware event processing loop begins when the host core 420 loads an initial or updated virtual machine $VM_i$ which is used to process a high priority thread for processing hardware events. In the initial pass of the loop, there is no need to store any "previous" virtual machine ($VM_{i-1}$), but in each succeeding iteration of the loop, the "previous" virtual machine ($VM_{i-1}$) may be stored at step 423.

At step 424, the host core 420 loads the hardware event mask with an event mask corresponding to the current virtual machine $VM_i$. In selected embodiments, the event mask may be sequentially loaded at each iterative pass i with a mask value in response to a timer interrupt signal issued by the interrupt timer upon expiration of a timer interval value. The event mask loading at step 424 may load a first set of hardware mask registers with a single mask value that corresponds to the current virtual machine $VM_i$, but may also preload a second set of hardware mask registers with an additional mask value that corresponds to the next virtual machine $VM_{i+1}$. As will be appreciated, the processing at step 424 may occur concurrently or consecutively with the virtual machine loading step 423.

At step 425, the host core 420 masks the latched channel hardware events to detect events for the current virtual machine $VM_i$. In selected embodiments, the masking step may be implemented with a logical AND gate which selects events for the current virtual machine $VM_i$ by logically combining the hardware event mask values (loaded at step 424) with the latched hardware events (latched at step 422), thereby filtering or masking out the hardware events so that only hardware events from the CAN channels of interest are supplied to the current virtual machine $VM_i$. As will be appreciated, the processing at step 425 may occur concurrently or consecutively with the processing steps 423-424.

At step 426, the host core 420 performs loop processing of the detected events (from step 425) using a wait-for-event instruction at the current virtual machine $VM_i$. In selected embodiments, the host core 420 performs the loop processing by executing a simple loop at the current virtual machine $VM_i$ to wait for events so that, when awakened, the virtual machine $VM_i$ processes the highest priority masked event which caused the core or thread to wake. If events of interest, as determined by the event mask, have already occurred, then they have been latched and will cause the wait-for-event instruction to immediately return for execution of the event by the host core 420. However, if no events of interest have occurred, then the host core 420 will either wait or execute a lower priority thread. When an event of interest does occur, the core either wakes or preempts the low priority thread, and then proceeds to execute the code associated with the high priority thread. Upon completion of the event processing, the host core 420 issues an event acknowledgement 427 that the event has been processed. This acknowledgement 427 may be issued to update the latched channel events (step 422) and/or to the CAN channel hardware devices 410 which stores and processes the acknowledgment (step 413).

At step 428, the host core 420 determines if the timer has expired. If not (negative outcome to detection step 428), then the loop processing continues at step 426 so that the current virtual machine $VM_i$ continues to process the detected (masked) events. However, once the timer expires (affirmative outcome to detection step 428), the counter value i is incremented (step 429) before checking the latched channel hardware events (step 422) and loading the next virtual machine (step 423) so that steps 423-426 are executed with reference to the next virtual machine and corresponding masked hardware events.

By now it should be appreciated that there has been provided a communication device, apparatus, method, program code, and system for ensuring freedom from interference for aggregated communication channel handling using event-based processor extensions. In disclosed embodiments of the communication device, a processor core executes event-based programming code to interface a plurality of isolated execution contexts with a set of external communication channel hardware devices using time division multiplexing. In selected embodiments, the event-based programming code includes a wait-for-event instruction which allows each isolated execution context to wait for an event in the masked subset of the hardware events. In such embodiments, the processor core executing event-based programming code is configured, upon interruption of the wait-for-event instruction by an interrupt signal, to resume running the wait-for-event instruction so that the processor core continues to wait for an event if none have yet occurred. In addition, the communication device includes an event latch is connected and configured to store n hardware events as single-bit signals received from the set of external communication channel hardware devices, where each hardware event is remembered until an acknowledgment received from the processor core signals that the hardware event has been processed. In selected embodiments, the event latch is implemented with n 1-bit latches connected and configured to store the n hardware events. The communication device also includes a timer circuit that generates a sequence of timer interrupt signals. In selected embodiments, the timer circuit generates the sequence of timer interrupt signals at uniform timing intervals. In other embodiments, the timer circuit generates the sequence of timer interrupt signals as a plurality of predetermined timing intervals corresponding, respectively, to the plurality of isolated execution contexts. In addition, the communication device includes a masking circuit connected and configured to mask the n hardware events stored in the event latch with an n-bit event mask in response to each timer interrupt signal, where each n-bit event mask is associated with a different isolated execution context running on the processor such that each isolated execution context is allowed to process only a masked subset of the hardware events specified by the n-bit event mask to ensure freedom from interference between the plurality of isolated execution contexts when communicating with the set of external communication channel hardware devices. In selected embodiments, the masking circuit includes a hardware event mask register and an event selection circuit. The hardware event mask register may be connected and configured to sequentially store a plurality of n-bit event masks, where each n-bit event mask is sequentially loaded into the hardware event mask register in response to a timer interrupt signal generated by the timer circuit. In addition, the event selection circuit may be connected to logically combine the n hardware events stored in the event latch with an n-bit event mask stored in the hardware event mask register, thereby generating the masked subset of the hardware events in response to each timer interrupt signal.

In another form, there is provided a processor-based method and apparatus for using time division multiplexing to interface a plurality of isolated execution contexts with a set of external communication channel hardware devices. In selected embodiments, each isolated execution context may be a virtual machine, an operating system process, or any process requiring isolation from another process when accessing one or more of the plurality of n hardware events. In the disclosed methodology, an event latch stores a plurality of n single-bit signals corresponding to a plurality of n hardware events generated by the set of external communication channel hardware devices, where each hardware event is stored at the event latch until an acknowledgment is received signaling that said hardware event has been processed. In selected embodiments, the event latch is embodied with n 1-bit latches connected and configured to store the plurality of n hardware events. The disclosed methodology also includes sequentially masking the plurality of n hardware events stored in the event latch with a sequence of n-bit event masks which are sequentially applied by a masking circuit in response to a plurality of timer interrupt signals generated by a timer circuit to generate, for each isolated execution context, a masked subset of hardware events specified by an n-bit event mask corresponding to said isolated execution context. In selected embodiments, the masking circuit includes a hardware event mask register connected and configured to sequentially store a plurality of n-bit event masks, where each n-bit event mask is sequentially loaded into the hardware event mask register in response to a timer interrupt signal generated by the timer circuit. The masking circuit may also include an event selection circuit connected to logically combine the n hardware events stored in the event latch with an n-bit event mask stored in the hardware event mask register, thereby generating the masked subset of the hardware events in response to each timer interrupt signal. In selected embodiments, the timer circuit generates the plurality of timer interrupt signals at uniform timing intervals. In other embodiments, the timer circuit generates the plurality of timer interrupt signals as a plurality of predetermined timing intervals corresponding, respectively, to the plurality of isolated execution contexts. In addition, the disclosed methodology includes sequentially enabling, by a processor executing event-based programming code, each isolated execution context to communicate on the set of external communication channel hardware devices using only the masked subset of hardware events specified by the n-bit event mask corresponding to said isolated execution context to ensure freedom from interference between the plurality of isolated execution contexts when communicating with the set of external communication channel hardware devices. In selected embodiments, the event-based programming code includes a wait-for-event instruction which allows each isolated execution context to wait for an event in the masked subset of hardware events. In such embodiments, the processor executing event-based programming code may be configured, upon interruption of the wait-for-event instruction by a timer interrupt signal, to resume running the wait-for-event instruction so that the processor continues to wait for an event if none have yet occurred.

In yet another form, there is provided a computer system, method and apparatus for interfacing a plurality of isolated execution contexts with a set of external communication channel hardware devices. As disclosed, the computer system includes a multithreaded processor executing event-based programming code to control communications between a plurality of isolated execution contexts and a set of external hardware devices. In addition, the computer system includes an event register operatively connected to the multithreaded processor to store hardware events generated by the set of external hardware devices until an acknowledgment received from the multithreaded processor signals that the hardware event has been processed. The computer system also includes an event mask hardware operatively connected to the multithreaded processor to store a plurality of event masks, where each event mask is associated with a different isolated execution context running on the multithreaded processor. In addition, the computer system includes an event selection circuit operatively connected to the event register and event mask hardware to select, for each isolated execution context, a subset of the hardware events stored in the event register based on an event mask stored in the event mask hardware. In selected embodiments, the event selection circuit includes a control circuit providing a bitwise logical AND gating function connected to receive an n-bit output from the event register and an n-bit output from the event mask register, and to generate an n-bit subset of the hardware events for each isolated execution context in response to a timing interrupt signal provided to the event mask hardware. The computer system may also include further comprising a timer circuit operatively connected to provide a sequence of timer interrupt signals to the event mask hardware which sequentially outputs a sequence of event masks corresponding, respectively, to the plurality of isolated execution contexts. In operation, the multi-threaded processor controls communications between the plurality of isolated execution contexts and the set of external hardware devices by allocating the hardware events stored in the event register to the plurality of isolated execution contexts based on the subset of the hardware events selected by the event selection circuit so that each isolated execution context is enabled to process only the subset of hardware events to ensure freedom from interference between the plurality of isolated execution contexts when communicating with the set of external hardware devices. In selected embodiments, each isolated execution context may be a virtual machine, an operating system process, or any process requiring isolation from another process when accessing the hardware events.

Techniques described herein can be applied to any type of data processing system for handling aggregated communication channels associated with external hardware interfaces, including but not limited to a processor used in an In-Vehicle Networks (IVNs), including a CAN, a LIN, an Ethernet network, a FlexRay® compatible network, and other types of IVNs. Although described herein with reference to handling aggregated CAN communication channels, it should be noted that the disclosure is not restricted to CAN devices. For example, the above-described techniques can be applicable to CAN, CAN-FD, and ISO 11898 compliant networks. The above-described techniques can also be implemented in a CAN device, such as a CAN transceiver IC device, a microcontroller IC device, or an IC device that includes both a CAN transceiver and a microcontroller.

Embodiments of the present invention may be implemented using any of a variety of different information processing systems. Accordingly, while selected figures with their accompanying description relate to exemplary general purpose and embedded processor-type information processing architectures, these exemplary architectures are merely illustrative. More particularly, although DSP core designs, such as depicted in FIG. 3, provide a useful context in which to illustrate our techniques, any type of SOEMT-type processor core designs can be applied to implement non-interference between virtual machines. Of course, architectural descriptions herein have been simplified for purposes of discussion and those skilled in the art will recognize that illustrated boundaries between logic blocks or components are merely illustrative and that alternative embodiments may merge logic blocks or circuit elements and/or impose an alternate decomposition of functionality upon various logic blocks or circuit elements.

Articles, system and apparati that implement the present invention are, for the most part, composed of electronic components, circuits and/or code (e.g., software, firmware and/or microcode) known to those skilled in the art and functionally described herein. Accordingly, component, circuit and code details are explained at a level of detail necessary for clarity, for concreteness and to facilitate an understanding and appreciation of the underlying concepts of the present invention. In some cases, a generalized description of features, structures, components or implementation techniques know in the art is used so as avoid obfuscation or distraction from the teachings of the present invention.

In general, the terms "program" and/or "program code" are used herein to describe a sequence or set of instructions designed for execution on a computer system. As such, such terms may include or encompass subroutines, functions, procedures, object methods, implementations of software methods, interfaces or objects, executable applications, applets, servlets, source, object or intermediate code, shared and/or dynamically loaded/linked libraries and/or other sequences or groups of instructions designed for execution on a computer system.

It should also be noted that at least some of the operations for the methods described herein may be implemented using software instructions stored on a computer useable storage medium for execution by a computer. As an example, an embodiment of a computer program product includes a computer useable storage medium to store a computer readable program. The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD). Alternatively, embodiments of the disclosure may be implemented entirely in hardware or in an implementation containing both hardware and software elements. In embodiments which use software, the software may include but is not limited to firmware, resident software, microcode, etc.

Although the described exemplary embodiments disclosed herein focus on hardware extensions for handling aggregated CAN communication channels and methods for using same, the present invention is not necessarily limited to the example embodiments illustrate herein and may be applied to any event-based data processing system that uses event-based programming extensions in order to be able to quickly respond to the per-channel low-level protocol handling hardware, such as transmit and receive FIFOs, by using a hardware mask to select events of interest for processor handling of multiple virtual machines, thereby providing freedom of interference between sets of these channels mapped to multiple virtual machines in the larger system context. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An apparatus comprising:
a processor core executing event-based programming code to interface a plurality of isolated execution contexts with a set of external communication channel hardware devices using time division multiplexing;
an event latch connected and configured to store n hardware events as single-bit signals received from the set of external communication channel hardware devices, where each hardware event is remembered until an acknowledgment is received from the processor core signals that the hardware event has been processed;
a timer circuit that generates a sequence of timer interrupt signals; and
a masking circuit connected and configured to mask the n hardware events stored in the event latch with an n-bit event mask in response to each timer interrupt signal, where each n-bit event mask is associated with a different isolated execution context running on the processor core such that each isolated execution context is allowed to process only a masked subset of the hardware events specified by the n-bit event mask to ensure freedom from interference between the plurality of isolated execution contexts when communicating with the set of external communication channel hardware devices.

2. The apparatus of claim 1, where the event-based programming code executed by the processor core comprises a wait-for-event instruction which allows each isolated execution context to wait for an event in the masked subset of the hardware events.

3. The apparatus of claim 2, where the processor core executing event-based programming code is configured, upon interruption of the wait-for-event instruction by an interrupt signal, to resume running the wait-for-event instruction so that the processor core continues to wait for an event if none have yet occurred.

4. The apparatus of claim 1, where the event latch comprise n 1-bit latches connected and configured to store the n hardware events.

5. The apparatus of claim 1, where the timer circuit generates the sequence of timer interrupt signals at uniform timing intervals.

6. The apparatus of claim 1, where the timer circuit generates the sequence of timer interrupt signals as a plurality of predetermined timing intervals corresponding, respectively, to the plurality of isolated execution contexts.

7. The apparatus of claim 1, where the masking circuit comprises:
a hardware event mask register connected and configured to sequentially store a plurality of n-bit event masks, where each n-bit event mask is sequentially loaded into the hardware event mask register in response to a timer interrupt signal generated by the timer circuit; and
an event selection circuit connected to logically combine the n hardware events stored in the event latch with an n-bit event mask stored in the hardware event mask register, thereby generating the masked subset of the hardware events in response to each timer interrupt signal.

8. The apparatus of claim 1, where each isolated execution context comprises a virtual machine, an operating system process, or any process requiring isolation from another process when accessing one or more of the n hardware events.

9. A processor-based method for using time division multiplexing to interface a plurality of isolated execution contexts with a set of external communication channel hardware devices, comprising:
storing, at an event latch, a plurality of n single-bit signals corresponding to a plurality of n hardware events generated by the set of external communication channel hardware devices, where each hardware event is stored at the event latch until an acknowledgment is received signaling that said hardware event has been processed;
sequentially masking the plurality of n hardware events stored in the event latch with a sequence of n-bit event masks which are sequentially applied by a masking circuit in response to a plurality of timer interrupt signals generated by a timer circuit to generate, for each isolated execution context, a masked subset of hardware events specified by an n-bit event mask corresponding to said isolated execution context; and
sequentially enabling, by a processor executing event-based programming code, each isolated execution context to communicate on the set of external communication channel hardware devices using only the masked subset of hardware events specified by the n-bit event mask corresponding to said isolated execution context to ensure freedom from interference between the plurality of isolated execution contexts when communicating with the set of external communication channel hardware devices.

10. The processor-based method of claim 9, where each isolated execution context comprises a virtual machine, an operating system process, or any process requiring isolation from another process when accessing one or more of the plurality of n hardware events.

11. The processor-based method of claim 9, where the event-based programming code comprises a wait-for-event instruction which allows each isolated execution context to wait for an event in the masked subset of hardware events.

12. The processor-based method of claim 11, where the processor executing event-based programming code is configured, upon interruption of the wait-for-event instruction by a timer interrupt signal, to resume running the wait-for-event instruction so that the processor continues to wait for an event if none have yet occurred.

13. The processor-based method of claim 9, where the event latch comprise n 1-bit latches connected and configured to store the plurality of n hardware events.

14. The processor-based method of claim 9, further comprising generating, by the timer circuit, the plurality of timer interrupt signals at uniform timing intervals.

15. The processor-based method of claim 9, further comprising generating, by the timer circuit, the plurality of timer interrupt signals as a plurality of predetermined timing intervals corresponding, respectively, to the plurality of isolated execution contexts.

16. The processor-based method of claim 9, where the masking circuit comprises:
a hardware event mask register connected and configured to sequentially store a plurality of n-bit event masks, where each n-bit event mask is sequentially loaded into the hardware event mask register in response to a timer interrupt signal generated by the timer circuit; and an event selection circuit connected to logically combine the n hardware events stored in the event latch with an n-bit event mask stored in the hardware event mask register, thereby generating the masked subset of the hardware events in response to each timer interrupt signal.

17. A computer system, comprising:
(a) a multithreaded processor executing event-based programming code to control communications between a plurality of isolated execution contexts and a set of external hardware devices;
(b) an event register operatively connected to the multithreaded processor to store hardware events generated by the set of external hardware devices until an acknowledgment received from the multithreaded processor signals that the hardware event has been processed;
(c) an event mask hardware operatively connected to the multithreaded processor to store a plurality of event masks, where each event mask is associated with a different isolated execution context running on the multithreaded processor; and
(d) an event selection circuit operatively connected to the event register and event mask hardware to select, for each isolated execution context, a subset of the hardware events stored in the event register based on an event mask stored in the event mask hardware;
wherein the multithreaded processor controls communications between the plurality of isolated execution contexts and the set of external hardware devices by allocating the hardware events stored in the event register to the plurality of isolated execution contexts based on the subset of the hardware events selected by the event selection circuit so that each isolated execution context is enabled to process only the subset of hardware events to ensure freedom from interference between the plurality of isolated execution contexts when communicating with the set of external hardware devices.

18. The computer system of claim 17, where each isolated execution context comprises a virtual machine, an operating system process, or any process requiring isolation from another process when accessing the hardware events.

19. The computer system of claim 17, where the event selection circuit comprises a control circuit providing a bit-wise logical AND gating function connected to receive an n-bit output from the event register and an n-bit output from the event mask register, and to generate an n-bit subset of the hardware events for each isolated execution context in response to a timing interrupt signal provided to the event mask hardware.

20. The computer system of claim 17, further comprising a timer circuit operatively connected to provide a sequence of timer interrupt signals to the event mask hardware which sequentially outputs a sequence of event masks corresponding, respectively, to the plurality of isolated execution contexts.

* * * * *